(12) United States Patent
Jin et al.

(10) Patent No.: US 10,171,132 B1
(45) Date of Patent: Jan. 1, 2019

(54) CURRENT-MODE RECEIVERS FOR INDUCTION-BASED COMMUNICATION AND RELATED METHODS

(71) Applicant: MEDIATEK Singapore Pte. Ltd., Solaris (SG)

(72) Inventors: Liming Jin, Singapore (SG); Eng-Chuan Low, Singapore (SG); Chee Hong Yong, Kuala Lumpur (MY)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/867,355

(22) Filed: Jan. 10, 2018

Related U.S. Application Data

(60) Provisional application No. 62/556,535, filed on Sep. 11, 2017.

(51) Int. Cl.

| | |
|---|---|
| *H03F 3/24* | (2006.01) |
| *H03M 5/12* | (2006.01) |
| *H04B 5/00* | (2006.01) |
| *G01R 19/00* | (2006.01) |
| *G06Q 20/32* | (2012.01) |

(52) U.S. Cl.
CPC ....... *H04B 5/0068* (2013.01); *G01R 19/0092* (2013.01); *H04B 5/0031* (2013.01); *H04B 5/0075* (2013.01); *G06Q 20/3278* (2013.01); *H03F 3/245* (2013.01); *H03M 5/12* (2013.01)

(58) Field of Classification Search
CPC .. H04B 5/0068; H04B 5/0031; H04B 5/0075; G01R 19/0092; G06Q 20/3278; H03F 3/245; H03M 5/12
See application file for complete search history.

(56) References Cited

U.S. PATENT DOCUMENTS

| | | | |
|---|---|---|---|
| 2007/0127185 A1* | 6/2007 | Watanabe .......... | G06K 19/0701 361/143 |
| 2010/0124298 A1* | 5/2010 | Jang .................... | H04L 25/0272 375/296 |
| 2011/0060530 A1* | 3/2011 | Fennell .............. | A61B 5/14532 702/19 |
| 2017/0250733 A1* | 8/2017 | Henderson ............. | G08C 19/02 |

* cited by examiner

*Primary Examiner* — Nguyen T Vo
(74) *Attorney, Agent, or Firm* — Wolf, Greenfield & Sacks, P.C.

(57) ABSTRACT

A transceiver for use in induction-based communication protocols, such as radio-frequency identification (RFID) and near field communication (NFC), is described. The transceiver may be arranged such that the transmitter and the receiver share a common input/output (I/O) terminal. The transceiver may be configured to interrogate a transponder to which it is inductively coupled, and to wait for the transponder's response. Data transmitted back by the transponder may be detected by sensing an impedance modulation at the I/O terminal or at a node whose impedance varies with the I/O terminal. The impedance modulation may be sensed by allowing a current to be modulated by the impedance variation and by converting the current into a voltage. The corresponding voltage modulation may be sensed by a receiver.

20 Claims, 7 Drawing Sheets

CURRENT-MODE RECEIVERS FOR INDUCTION-BASED COMMUNICATION AND RELATED METHODS

RELATED APPLICATIONS

This Application claims priority under 35 U.S.C. § 119(e) to U.S. Provisional Application Ser. No. 62/556,535, entitled "NFC PCD CURRENT MODE RECEIVER" filed on Sep. 11, 2017, which is herein incorporated by reference in its entirety.

BACKGROUND

Near field communication (NFC) includes a set of communication protocols allowing communication between electronic devices over short distances, typically within a few centimeters. NFC devices are used in numerous applications, including in contactless payment systems such as credit cards, electronic ticket smartcards and mobile payment systems.

BRIEF SUMMARY

Some aspects of the present application relate to a method comprising generating a current with a transmitter of an integrated circuit (IC) and coupling the current to an inductor via an input/output (I/O) terminal of the IC, and sensing information received at the IC through the inductor by sensing a variation in impedance seen at the I/O terminal. Sensing the variation in impedance comprises sensing the current coupled to the inductor, converting the sensed current into a voltage, and sensing a variation in the voltage with a receiver.

Some aspects of the present application relate to an apparatus comprising an integrated circuit (IC). The IC comprises a transmitter, a receiver, an input/output (I/O) terminal connected to the transmitter and configured to be coupled to an inductor, a current sensor configured to sense a current of the transmitter, convert the sensed current into a voltage, and provide the voltage to the receiver; wherein the current is modulated by a variation in impedance seen at the I/O terminal.

Some aspects of the present application relate to an electronic device configured to receive, via load modulation, data from a complimentary electronic device magnetically coupled to the electronic device, the electronic device comprising an integrated circuit (IC). The IC comprises a transmitter, a receiver, an input/output (I/O) terminal connected to the transmitter and configured to be coupled to an inductor, and a current-to-voltage converter coupled to an output of the transmitter at the I/O terminal and to an input of the receiver.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

The inventors have appreciated that the cost associated with transceivers for use in communication protocols based on inductive coupling, examples of which are radio-frequency identification (RFID) and near field communication (NFC), can be decreased by designing the transceiver such that the transmitter and the receiver share the same input/output (I/O) terminal.

Some induction-based communication protocols allow transfer of data from a transponder to a reader via load modulation. First, a reader transmits an electromagnetic signal to the transponder. Transfer of the signal occurs via magnetic induction through a pair of coils, one coil being disposed on the reader and the other coil on the transponder. Upon receiving the electromagnetic signal, the transponder, which typically lacks power sources, extracts energy from the signal and uses this energy to power its operations. Subsequently, the transponder transmits data back to the reader. The data may include, for example, credit card numbers, personal information, product identifiers, information for granting access to buildings, etc. The data is sent to the reader via load modulation. That is, the transponder modulates, based on the information to be transmitted, the impedance of a load. Modulation of the transponder's load causes, via magnetic induction, modulation of the reader's input impedance. Therefore, the information can be sensed by the reader by sensing the modulation in load impedance.

Figure 1:
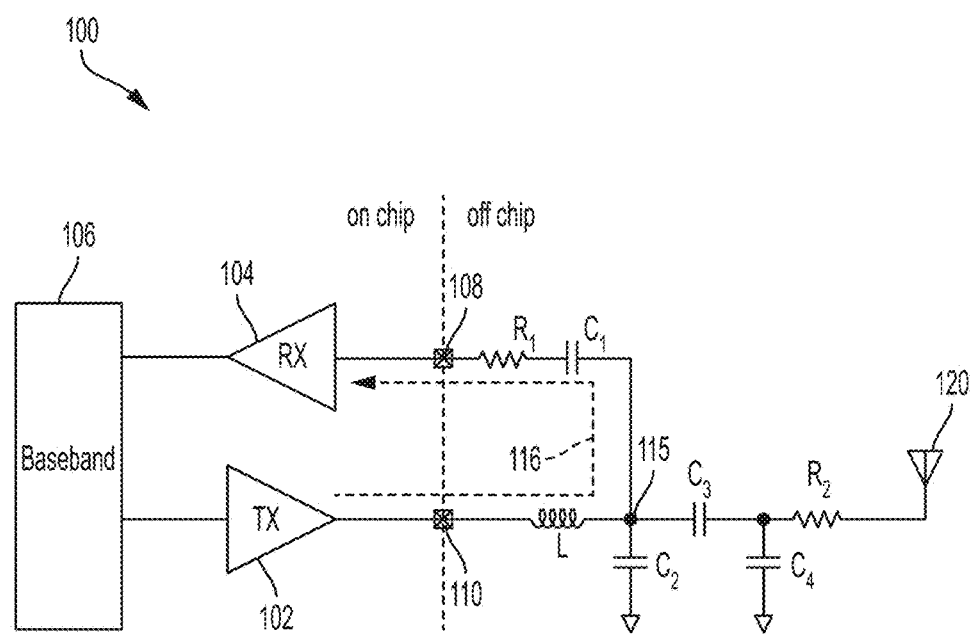
FIG. 1 is a block diagram illustrating a transceiver in which the receiver and the transmitter have separate I/O terminals.

To sense the impedance modulation, some transceivers include separate I/O terminals for the transmitter and the receiver. An example of a transceiver is illustrated in FIG. 1. Transceiver 100 includes a chip having a transmitter (TX) 102, a receiver (RX) 104, baseband circuitry 106 and I/O terminals 108 and 110. The baseband circuitry includes circuits for generating signals to be transmitted via TX 102 and for processing signals received via RX 104. I/O terminal 108 couples RX 104 to other off-chip circuitry and I/O terminal 110 couples TX 102 to the off-chip circuitry. Positioned off-chip, typically on a printed circuit board on which the chip sits, are several passive components and inductor 120, typically a coil. Inductor L is coupled between I/O terminal 110 and node 115. Resistor $R_1$ and capacitor $C_1$ are coupled between I/O terminal 108 and node 115. Capacitor $C_2$ couples node 115 to ground. Capacitors $C_3$ and $C_4$ and resistor $R_2$ form a matching network configured to provide a desired resonant frequency and a load for effective power transfer.

When a signal is received from a transponder, such as that which may be found on a credit card, the impedance of the off-chip passive circuitry is modulated based on the information encoded in the signal. To sense the information, transceiver 100 generates a loop-back signal. In particular, TX 102 generates a signal, typically a sinusoidal signal oscillating at a carrier frequency, and loops it back to RX 104 via signal path 116. Signal path 116 includes I/O terminal 110, inductor L, node 115, capacitor $C_1$, resistor $R_1$ and I/O terminal 108. Since the impedance at node 115 is modulated by the signal received through the inductor 120, the signal received by RX 104 via signal path 116 is modulated accordingly. Therefore, RX 104 receives a signal that is representative of the information transmitted by the transponder.

The inventors have appreciated that these transceivers require the use of dedicated passive components, inductor L, capacitor $C_1$ and resistor $R_1$ in this example, for allowing the transceiver to sense impedance modulation via a loop-back signal. Since integration of these passive components on the chip is impractical due to design constraints in modern complementary metal-oxide-semiconductor (CMOS) processes, they are typically formed as discrete components on the printed circuit board. The use of discrete components, however, negatively affects the transceiver design in numerous ways. First, it increases costs. Unlike integrated circuits, which can include millions of components at a relatively low marginal cost, the cost of discrete components does not scale as well. For example, the cost of producing a single inductor can often exceed the cost of producing the entire transceiver chip. Second, discrete components occupy significant real estate, thus increasing the overall size of the transceiver. The amount of space for accommodating these transceivers, however, is often very limited. Some of these transceivers, for example, are mounted on smart phones, which include numerous other systems for supporting all the functionalities.

Recognizing these negatives effects, the inventors have developed transceivers that do not require the use of large discrete components for sensing impedance variations. Accordingly, some embodiments of the present disclosure are directed to transceivers in which the transmitter and the receiver share a common I/O terminal. Reception of the information transmitted by the transponder may be accomplished by sensing variations of impedance at the common I/O terminal. In some embodiments, sensing variations in impedance may include generating a current with the transmitter, allowing the current to be modulated by the impedance variations, converting the current into a voltage, and providing the modulated voltage to the receiver.

Figure 2:
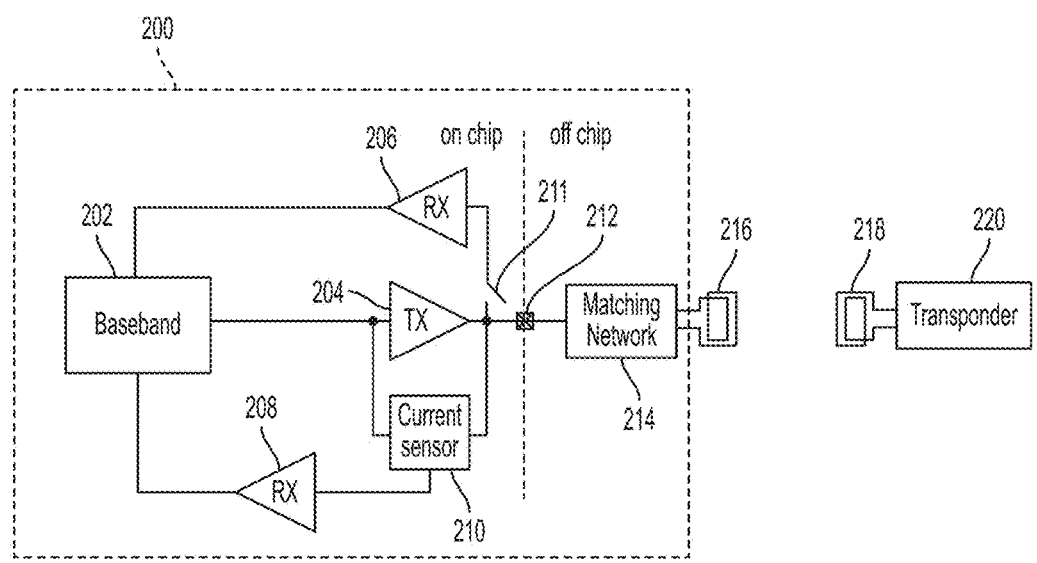
FIG. 2 is a block diagram illustrating a transceiver in which the receiver and the transmitter share the same input/output (I/O) terminal, in accordance with some non-limiting embodiments.

FIG. 2 is a block diagram illustrating an inductively coupled communication system, in accordance with some non-limiting embodiments. In this example, transceiver 200 is coupled with transponder 220. Transceiver 200 may be mounted on various types of devices, such as smartphones or other mobile devices, electronic ticket readers, credit card readers, etc. Transponder 220 may be mounted on a product tag, credit card or other systems. Transceiver 200 and transponder 220 may communicate, via magnetic induction, using any suitable communication protocol including RFID and NFC. Transfer of data between transceiver 200 and transponder 220 may occur when the devices are positioned with a certain range of each other, such as less than 2 cm, less than 5 cm, less than 10 cm, less that 50 cm, less that 1 m or less than 5 m, among other ranges.

In the "reader mode", transceiver 200 may be configured to retrieve data from transponder 220 by interrogating it with an electromagnetic signal and waiting for the transponder's response. The energy received by the transponder through the electromagnetic signal may be captured and may be used to power the transponder's operations. As such, the transponder may be a fully passive device, lacking power supplies. In other embodiments, transceiver 200 may operate in a "card emulation mode", whereby the transceiver itself operates as a transponder and is coupled to another transceiver. The other transceiver may interrogate transceiver 200 to provide data.

Transceiver 200 may comprise baseband circuitry 202, transmitter (TX) 204, receivers (RX) 206 and 208, current sensor 210 and I/O terminal 212. These components may be disposed on a single integrated circuit (IC), or on multiple ICs. Transceiver 200 may further include matching network 214 and inductor 216. In some embodiments, the matching network and the inductor are disposed outside the IC(s) hosting the TX, RXs, current sensor, I/O terminal and baseband circuitry. Inductor 216 may be configured for induction-based coupling. For example, inductor 216 may include a coil having one or more windings (e.g., wire loops) serving as inductor(s) or a trace on a printed circuit board having one or more loops. Matching network 214 may be configured to provide a desired resonant frequency and a load for effective power transfer. In some embodiments, data may be transferred between inductor 216 and the transponder's inductor 218 at a frequency carrier that is approximately 13.56 MHz (e.g., 13.56 MHz±7 MHz). It should be appreciated, however, that other frequency bands (e.g., other industrial, scientific and medical bands) may be used for transferring data between the devices.

TX 204 may include circuitry for generating and transmitting signals via inductor 216. For example, TX 204 may include a digital-to-analog converter, a modulator (e.g., an amplitude shift keying modulator), a signal amplifier, a power amplifier, a current generator, an oscillator and/or a filter, among other components. TX 204 may be connected to the matching network and/or to other circuitry outside the TX's IC via I/O terminal 212. I/O terminal 212 may include any suitable combination of an electrode, a conductive pad, a wire bond, and a pin-out, depending on how the IC is laid out and packaged.

In some embodiments, RX 208 may be configured to receive data when the transceiver operates in the "reader mode" (when transceiver 200 is in communication with a transponder) and RX 206 may be configured to receive data when the transceiver operates in the "card emulation mode" (when transceiver 200 is in communication with another transceiver). As such, in the embodiments in which NFC protocols are used, RX 208 may be also referred to as a "proximity coupling device (PCD)" receiver and RX 206 as a "proximity inductive coupling card (PICC)" receiver. Both RXs may include circuitry for receiving signals transmitted by another device, whether a transponder or another transceiver. Among other components, the RXs may include a demodulator (e.g., an amplitude shift keying demodulator), a filter, an amplifier, an analog-to-digital converter, and/or a decoder (e.g., a Manchester decoder for decoding the received data), among other components. Baseband circuitry 202 may be a digital circuit arranged to generate data for transmitting via RX 204 and/or for processing data received via RX 206 and/or RX 208.

In some embodiments, when information transmitted by a device such as transponder 220 is received at I/O terminal 212, the impedance ($Z_{IO}$) seen by the transceiver at the I/O terminal 212 may be modulated by the information. Therefore, the information received with inductor 216 may be extracted by sensing the impedance modulation at I/O terminal 212 or at a node within the integrated circuit whose impedance varies with $Z_{IO}$.

To enhance the modulation index of the received signal, in some embodiments, current detection may be performed. The modulation index MI is referred to herein as $$MI=(S^H-S^L)/(S^H+S^L)$$

where $S^H$ is the value of a signal when encoded with a high value (e.g., representing a logical 1) and $S^L$ is the value of the signal when encoded with a low value (e.g., representing a logical 0). The modulation index represents depth with which a signal is modulated. The greater the modulation index, the easier the detection of the modulating data. To that end, the inventors have appreciated that sensing the current, rather than the voltage, produced by the TX at the I/O terminal 212 may significantly improve the modulation index of the received signal. In one example, the current of the TX is $$I_{TX}=V_{DD}/(Z_{IO}+Z_{TX})$$

where $V_{DD}$ is the supply voltage, and $Z_{TX}$ the output impedance of the RX. If it is assumed that $Z_{IO} \gg Z_{TX}$, then $I_{TX}$ is substantially equal to $V_{DD}/Z_{IO}$. Therefore, variations in $Z_{IO}$ caused by the received signal are reflected in $I_{TX}$. If it is further assumed that the $Z_{IO}^H$ is the value of $Z_{IO}$ when the received signal includes a high value and $Z_{IO}^L$ is the value of $Z_{IO}$ when the received signal includes a low value, the modulation index of $I_{TX}$ is given by:

$$MI_{ITX}=(I_{TX}^H-I_{TX}^L)/(I_{TX}^H+I_{TX}^L)=(Z_{IO}^H-Z_{IO}^L)/(Z_{IO}^H+Z_{IO}^L)$$

In one specific example, $V_{DD}=3V$, $Z_{TX}=1\Omega$, $Z_{IO}^H=30\Omega$ and $Z_{IO}^L=20\Omega$. In this example, $MI_{ITX}=20\%$.

By contrast, the voltage produced by TX 204 at I/O terminal 212 may be equal to, at least in some embodiments, $$V_{TX}=V_{DD}(Z_{IO}/(Z_{IO}+Z_{TX}))$$

If it is again assumed that $Z_{IO} \gg Z_{TX}$, then $V_{TX}$ is substantially equal to $V_{DD}$, and thus is virtually independent of $Z_{IO}$. Therefore, at least in this example, variations in $Z_{IO}$ are not captured or otherwise are weakly captured by $V_{TX}$, thus producing a low modulation index $MI_{VTX}$.

To sense $I_{TX}$ (or a current derived from $I_{TX}$), RX 208 may be coupled to I/O terminal 212 via current sensor 210. Current sensor 210 may be configured to sense the current provided by TX 204, and to provide a signal (e.g., a voltage) to RX 208 that depends on the TX's current. The current sensor may include a current-to-voltage converter, such as a trans-impedance amplifier. The signal received by the RX 208 thus reflects variations in $Z_{IO}$, and as a result, the information encoded in the signal received with the inductor 216.

RX 206 may be configured to receive signals in the "card emulation mode." In this mode, reception of the signal may be performed directly, that is, without load modulation. As such, RX 206 may be connected to I/O terminal 212, for example via switch 211. The switch may be in a high impedance state in the "reader mode" and may be conductive in the "card emulation mode."

Figure 3A:
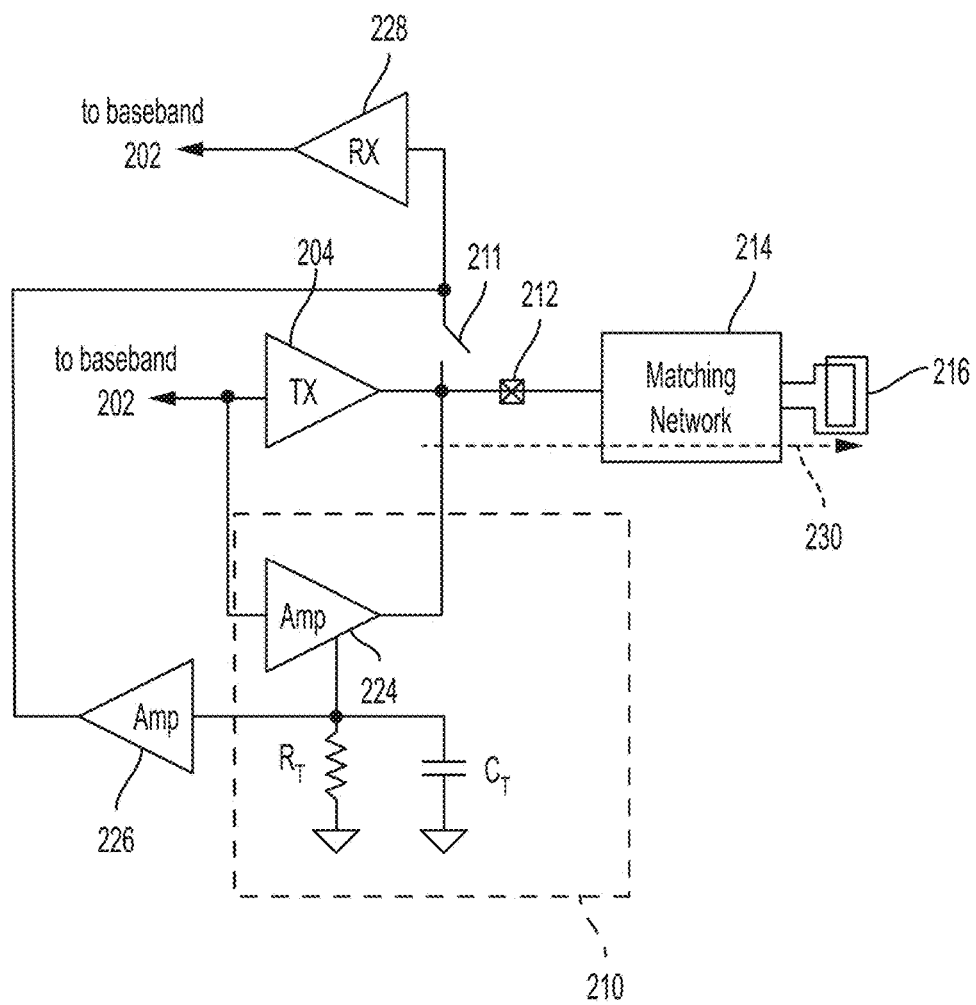
FIG. 3A is a block diagram of a representative transceiver illustrating a signal path from the transmitter to the inductor, in accordance with some non-limiting embodiments.
Figure 3B:
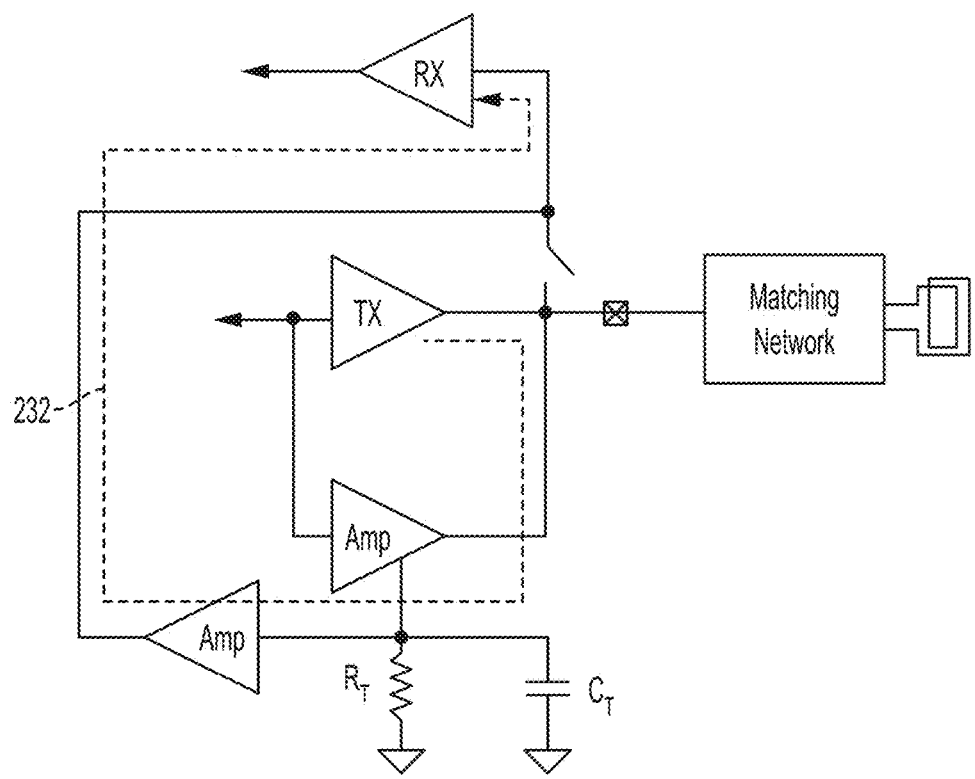
FIG. 3B is a block diagram of a representative transceiver illustrating a signal path from the transmitter to the receiver, in accordance with some non-limiting embodiments.

In some embodiments, as illustrated in FIGS. 3A-3B, a single receiver may be used for RXs 206 and 208. In this configuration, or in other configurations, current sensor 210 may be implemented using amplifier 224, resistor $R_T$ and capacitor $C_T$. The amplifier 224 may receive a fraction of the current of TX 204, and may generate a voltage across the terminals of the resistor that depends on the current. This voltage may be amplified, at least in some embodiments, using amplifier 226, and may be provided to RX 228. RX 228 may serve as RXs 206 and 208. As in FIG. 2, switch 211, coupling RX 228 to I/O terminal 212, may be in a high impedance state in the "reader mode" and may be conductive in the "card emulation mode."

FIG. 3A illustrates the signal path (numeral 230) formed from the TX 204 to inductor 216. This path may be traveled by a signal intended to interrogate a transponder or to transfer data to another device. The interrogation signal may be modulated in some embodiments, for example using an ASK format.

FIG. 3B illustrates the signal path (numeral 232) formed between TX 204 and RX 228. This path may be traveled in the reader mode, when the transponder transmits data to the transceiver. To sense variations in impedance caused by reception of the transponder data, the current of the TX 204 may be sensed, and the sensed current may be converted into a voltage. For example, TX 204 may output a voltage, such as an alternating current (AC) voltage oscillating at 13.56 MHz±7 KHz. When the impedance is modulated by the data, the current arising in response to the generated voltage may also be modulated, being the current the ratio between voltage and impedance. The current may be directed to the inductor for coupling to the transponder. A fraction of the current output by TX 204 may be routed to amplifier 224, and the sensed current converted into a voltage. The voltage may be amplified, at least in some embodiments, and transferred to RX 228, which may extract the information sent by the transponder.

Figure 3C:
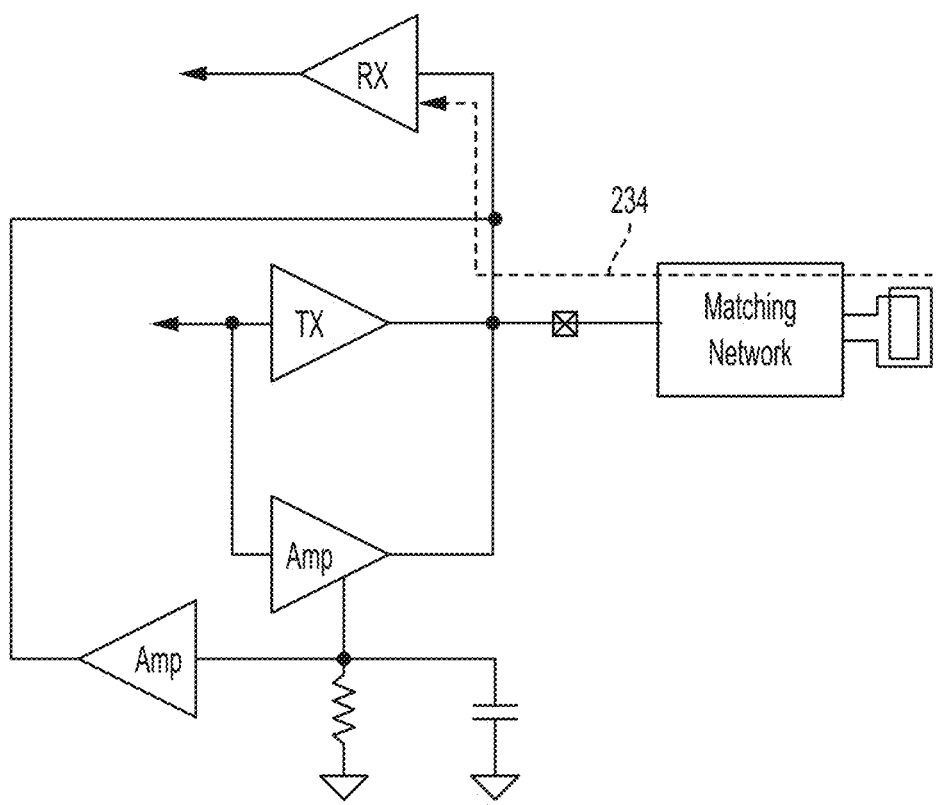
FIG. 3C is a block diagram of a representative transceiver illustrating a signal path from the inductor to the receiver, in accordance with some non-limiting embodiments.

FIG. 3C illustrates the signal path (numeral 234) that may be formed in the card emulation mode. In this case, the signal received at I/O terminal 212 may be transferred directly to RX 228, which may extract information from the signal or cause RX 204 to transmit a response signal.

Figure 3D:
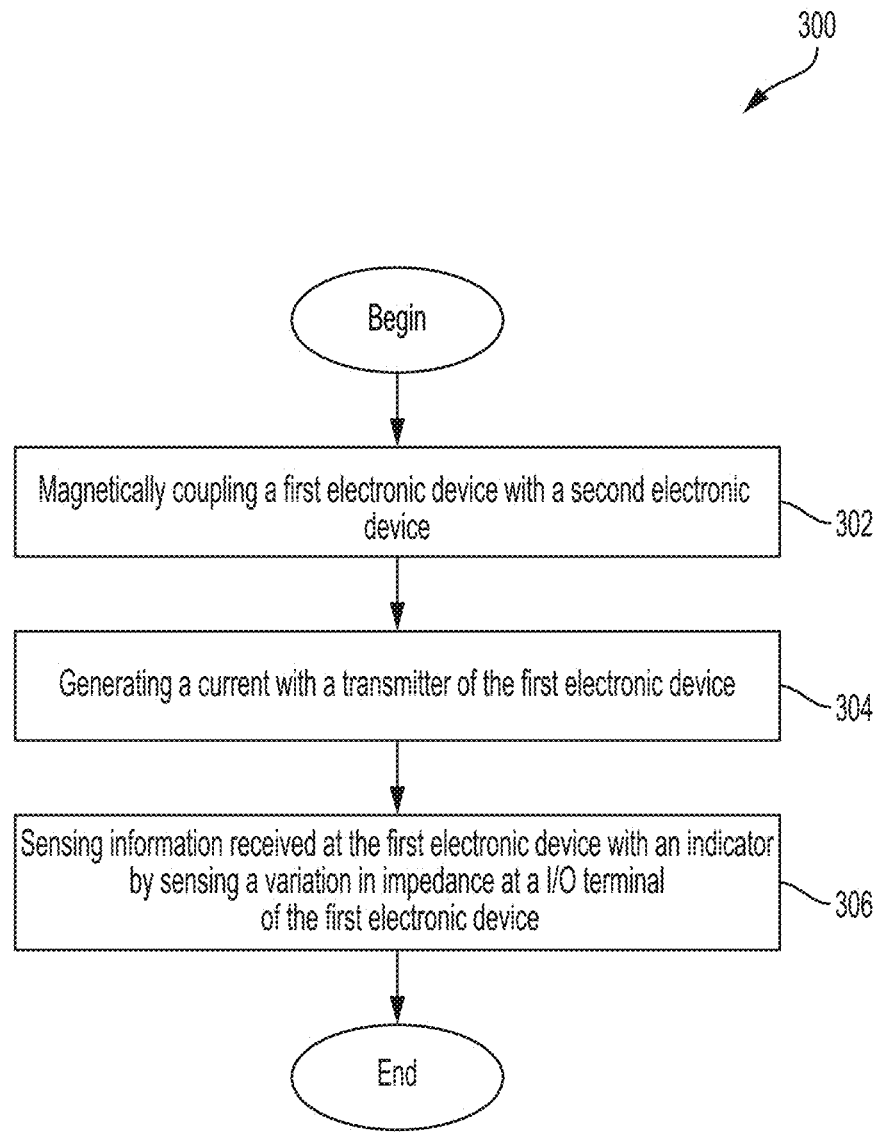
FIG. 3D is a flowchart illustrating a representative method for receiving a signal with a transceiver, in accordance with some non-limiting embodiments.

FIG. 3D is a flowchart illustrating a method that may be implemented using any of the embodiments described herein. Method 300 begins at block 302, in which a first electronic device is magnetically coupled to a second electronic device. The first electronic device may interrogate the second electronic device to solicit transmission of data. The first electronic device may include an integrated circuit (IC) including a transmitter, a receiver, and an I/O terminal coupled to the transmitter and the receiver. The I/O terminal may be further coupled to an inductor for coupling the two electronic devices.

At block 304, a current may be generated with the transmitter, and the current may be allowed to be modulated by variations in impedance caused by reception of data transmitted by the second electronic device. This may be accomplished, for example, by outputting a voltage with the transmitter at the I/O terminal, and by allowing the impedance to modulate the transmitter's output current.

At block 306, information received at the IC through the inductor may be sensed by sensing variations in the impedance seen at the I/O terminal. Sensing impedance variations may include: sensing the current, converting the sensed current into a voltage, and sensing modulation of the voltage with a receiver.

Figure 4A:
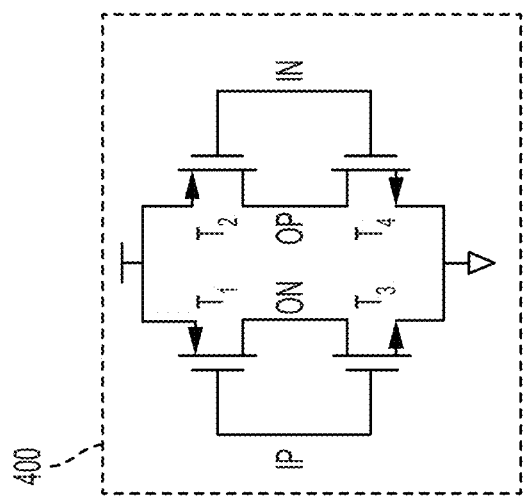
FIG. 4A is a circuit diagram illustrating an amplifier that may be used for the transmitter, in accordance with some non-limiting embodiments.

As described above, in some embodiments, TX 204 may include a power amplifier. An example of a power amplifier is illustrated in FIG. 4A. Power amplifier 400 is arranged to operate differentially, though single ended implementations are also possible. Amplifier 400 includes a first CMOS inverter having transistors $T_1$ and $T_3$, and a second CMOS inverter having transistors $T_2$ and $T_4$. IN an IP represent the differential input signal, and ON an OP represent the differential input signal.

Figure 4B:
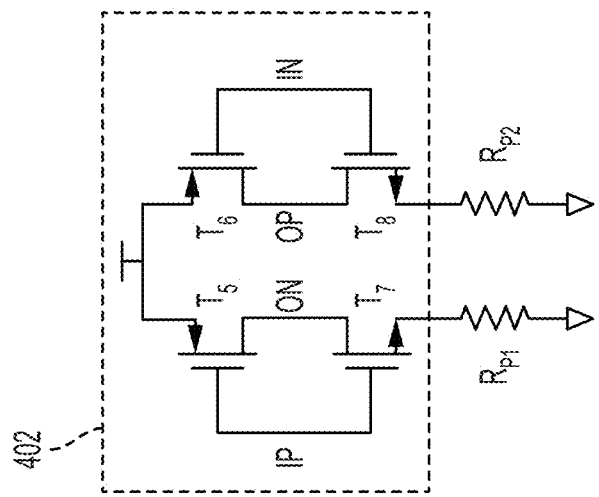
FIG. 4B is a circuit diagram illustrating an amplifier that may be used for the current sensor, in accordance with some non-limiting embodiments.

Amplifier 224, which may be used in current sensor 210, may be implemented in a similar fashion. A representative implementation of amplifier 224 is illustrated in FIG. 4B. In this case, amplifier 402 includes a first CMOS inverter having transistors $T_5$ and $T_7$, and a second CMOS inverter having transistors $T_6$ and $T_8$. IN an IP represent the differential input signal, and ON an OP represent the differential input signal. While the transistor arrangement may be the same as in amplifier 400 (at least in some embodiments), the transistors of amplifier 402 may be smaller relative to the transistors of amplifier 400. In this way, the amount of current drawn by amplifier 402 may be limited to a fraction of the current in amplifier 400, thus limiting the power consumption utilized for the current detection. Transistors $T_7$ and $T_9$ may connected in series to resistors $R_{P1}$ and $R_{P2}$, respectively. The voltage at the resistors may reflect variations in impedance at I/O terminal 212.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components.

What is claimed is:

1. A method comprising:
   generating a current with a transmitter of an integrated circuit (IC) and coupling the current to an inductor via an input/output (I/O) terminal of the IC; and
   sensing information received at the IC through the inductor by sensing a variation in impedance seen at the I/O terminal, wherein sensing the variation in impedance comprises:
      sensing the current coupled to the inductor;
      converting the sensed current into a voltage; and
      sensing a variation in the voltage with a receiver.

2. The method of claim 1, wherein the information is received at the IC in response to transmitting an interrogation signal with the inductor.

3. The method of claim 2, further comprising providing the interrogation signal with the transmitter.

4. The method of claim 2, wherein the interrogation signal is encoded in the current coupled to the inductor.

5. The method of claim 1, wherein sensing the current coupled to the inductor comprises routing a fraction of the current to a current-to-voltage converter.

6. The method of claim 1, further comprising decoding the information using a Manchester decoder.

7. An apparatus comprising:
   an integrated circuit (IC) comprising:
      a transmitter;
      a receiver;
      an input/output (I/O) terminal connected to the transmitter and configured to be coupled to an inductor;
      a current sensor configured to:
         sense a current of the transmitter;
         convert the sensed current into a voltage; and
         provide the voltage to the receiver;
      wherein the current is modulated by a variation in impedance seen at the I/O terminal.

8. The apparatus of claim 7, wherein the inductor comprises a coil.

9. The apparatus of claim 7, wherein the current sensor comprises a power amplifier.

10. The apparatus of claim 7, wherein the receiver is connected to the I/O terminal.

11. The apparatus of claim 10, wherein the receiver is connected to the I/O terminal via a switch.

12. The apparatus of claim 7, wherein the transmitter comprises an amplitude shift keying (ASK) modulator.

13. The apparatus of claim 7, further comprising a matching network coupled between the I/O terminal and the inductor and tuned at approximately 13.56 MHz.

14. The apparatus of claim 7, wherein the receiver comprises a Manchester decoder configured to decode information extracted from the voltage.

15. An electronic device configured to receive, via load modulation, data from a complimentary electronic device magnetically coupled to the electronic device, the electronic device comprising:
   an integrated circuit (IC) comprising:
      a transmitter;
      a receiver;
      an input/output (I/O) terminal connected to the transmitter and configured to be coupled to an inductor; and
      a current-to-voltage converter coupled to an output of the transmitter at the I/O terminal and to an input of the receiver.

16. The electronic device of claim 15, wherein the receiver is connected to the I/O terminal.

17. The electronic device of claim 16, wherein the receiver is connected to the I/O terminal via a switch.

18. The electronic device of claim 15, wherein the transmitter comprises an amplitude shift keying (ASK) modulator.

19. The electronic device of claim 15, further comprising a matching network coupled between the I/O terminal and the inductor and tuned at approximately 13.56 MHz.

20. The electronic device of claim 15, wherein the receiver comprises a Manchester decoder.

\* \* \* \* \*

UNITED STATES PATENT AND TRADEMARK OFFICE
CERTIFICATE OF CORRECTION

PATENT NO. : 10,171,132 B1
APPLICATION NO. : 15/867355
DATED : January 1, 2019
INVENTOR(S) : Liming Jin et al.

Page 1 of 1

It is certified that error appears in the above-identified patent and that said Letters Patent is hereby corrected as shown below:

On the Title Page

Item [71], delete "Solaris" and replace it with -- Singapore --.

Signed and Sealed this
Twenty-fifth Day of June, 2019

Andrei Iancu
*Director of the United States Patent and Trademark Office*